(12) United States Patent
Bai et al.

(10) Patent No.: US 9,462,319 B2
(45) Date of Patent: Oct. 4, 2016

(54) METHOD AND APPARATUS FOR SENSOR SYNTHESIS AND ARBITRATION BETWEEN MOBILE DEVICES AND VEHICLES

(71) Applicants: GM GLOBAL TECHNOLOGY OPERATIONS LLC, Detroit, MI (US); GENERAL MOTORS LLC, Detroit, MI (US)

(72) Inventors: Fan Bai, Ann Arbor, MI (US); Donald K. Grimm, Utica, MI (US); Bo Yu, Warren, MI (US); Lakshmi V. Thanayankizil, Rochester Hills, MI (US); David P. Pop, Garden City, MI (US); Robert A. Hrabak, West Bloomfield, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 174 days.

(21) Appl. No.: 14/455,755

(22) Filed: Aug. 8, 2014

(65) Prior Publication Data

US 2016/0044364 A1    Feb. 11, 2016

(51) Int. Cl.
*H04N 21/414* (2011.01)
*H04N 21/41* (2011.01)
*H04N 7/16* (2011.01)
*H04N 21/4363* (2011.01)
*H04N 21/462* (2011.01)

(52) U.S. Cl.
CPC ........ *H04N 21/41422* (2013.01); *H04N 7/162* (2013.01); *H04N 21/4126* (2013.01); *H04N 21/43637* (2013.01); *H04N 21/4622* (2013.01)

(58) Field of Classification Search
CPC .................. H04N 21/41422; H04N 21/4126; H04N 7/162; H04N 21/43637; H04N 21/4622
USPC ......................................................... 701/472
See application file for complete search history.

(56) References Cited

U.S. PATENT DOCUMENTS

| | | | |
|---|---|---|---|
| 8,150,617 B2 * | 4/2012 | Manber | G01C 21/3644 340/990 |
| 8,209,120 B2 * | 6/2012 | Breed | G08G 1/161 340/539.2 |
| 8,706,693 B2 * | 4/2014 | Miyazaki | G01C 21/32 701/450 |
| 8,748,518 B2 * | 6/2014 | Raasch-Malberg | C08K 5/3435 524/102 |
| 8,924,049 B2 * | 12/2014 | Kumar | B61L 27/0027 701/19 |
| 8,935,095 B2 * | 1/2015 | Hartman | G01C 21/20 340/146.2 |
| 8,972,175 B2 * | 3/2015 | Annapureddy | G01C 21/3453 701/414 |

\* cited by examiner

*Primary Examiner* — Richard Camby
(74) *Attorney, Agent, or Firm* — John A. Miller; Miller IP Group, PLC

(57) ABSTRACT

A system and method for using data that is external to a vehicle in vehicular applications. The system and method include determining data that is external to the vehicle is available for use, comparing the external data to data that is available from a vehicle system, and determining whether the external data has a higher utility function compared to data that is available from a vehicle system. The system and method further include using the external data to enhance a vehicular application if the external data has a higher utility function.

20 Claims, 3 Drawing Sheets

METHOD AND APPARATUS FOR SENSOR SYNTHESIS AND ARBITRATION BETWEEN MOBILE DEVICES AND VEHICLES

BACKGROUND OF THE INVENTION

1. Field of the Invention

This invention relates generally to a system and method for leveraging external information sources to enhance sensing capabilities and, more particularly, to a system and method for using information from paired electronic devices and internet-accessible systems to enhance sensing capabilities of a primary system such as a vehicle system.

2. Discussion of the Related Art

Cell phones have become increasingly sophisticated in recent years, and are now commonly used for email, internet access, various special-purpose applications, and, of course, their utility as a phone. Cell phones with such capabilities are often referred to as smartphones. Smartphones are typically designed to allow wireless Local Area Network (wireless LAN, also known as WiFi) or other wireless communications to be used for all applications except actual cell phone calls. However, in the absence of WiFi or other wireless communication channels, the cellular communication network is used to deliver data for all applications on demand.

Because of the wealth of applications supported by smartphones, many modern vehicles now support seamless integration of one or more smartphones with the vehicles' infotainment systems. For example, a smartphone could be used to stream music from an internet radio service to be played over a vehicle's audio system, or the smartphone could access an internet-based video-sharing site and display the videos on the vehicle's rear-seat entertainment screen. Many vehicles support integration of smartphones using wireless communication technologies, such as Bluetooth and WiFi, within the vehicle.

Other types of electronic devices are also frequently used in vehicles. Such devices include tablet-type computers and ebook readers, laptop computers, MP3 music players, gaming devices and others. Some of these devices may have cellular communications capability, while others do not. However, many such devices have some sort of wireless communication capability—such as Bluetooth or WiFi—which allow the devices to transfer files and data when network services are available. These devices may also have hardwire-connection data transfer capability, such as a universal serial bus (USB).

While it is known to pair a mobile device to a vehicle, there is a need in the art to enable mobile device sensors or other internet-accessible sensors to collaborate with a vehicle embedded platform, commonly referred to as a vehicle head unit, to leverage sensor capability that is external to the vehicle such that vehicle sensing capability is enhanced.

SUMMARY OF THE INVENTION

In accordance with the teachings of the present invention, a system and method are disclosed for using data that is external to a vehicle in vehicular applications. The system and method include determining data that is external to the vehicle is available for use, comparing the external data to data that is available from a vehicle system, and determining whether the external data has a higher utility function compared to data that is available from a vehicle system. The system and method further include using the external data to enhance a vehicular application if the external data has a higher utility function.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method that utilizes data from an electronic device that is external to the vehicle to enhance vehicular applications is merely exemplary in nature. For example, while a vehicle environment is described herein, other environments for using data from an external device to enhance an application running on a platform paired to the external device may be used as described herein.

As stated above, electronic devices that are capable of being connected to a vehicle's information and entertainment (infotainment system) are known to those skilled in the art. For the sake of simplicity, all electronic devices in the following discussion will be referred to as smartphones, but it is to be understood that the methods and systems described herein are applicable to any suitable electronic device. Furthermore, it is to be understood that the electronic devices are connected to a vehicle head unit that includes a processor that is capable of performing as described herein.

Figure 1:
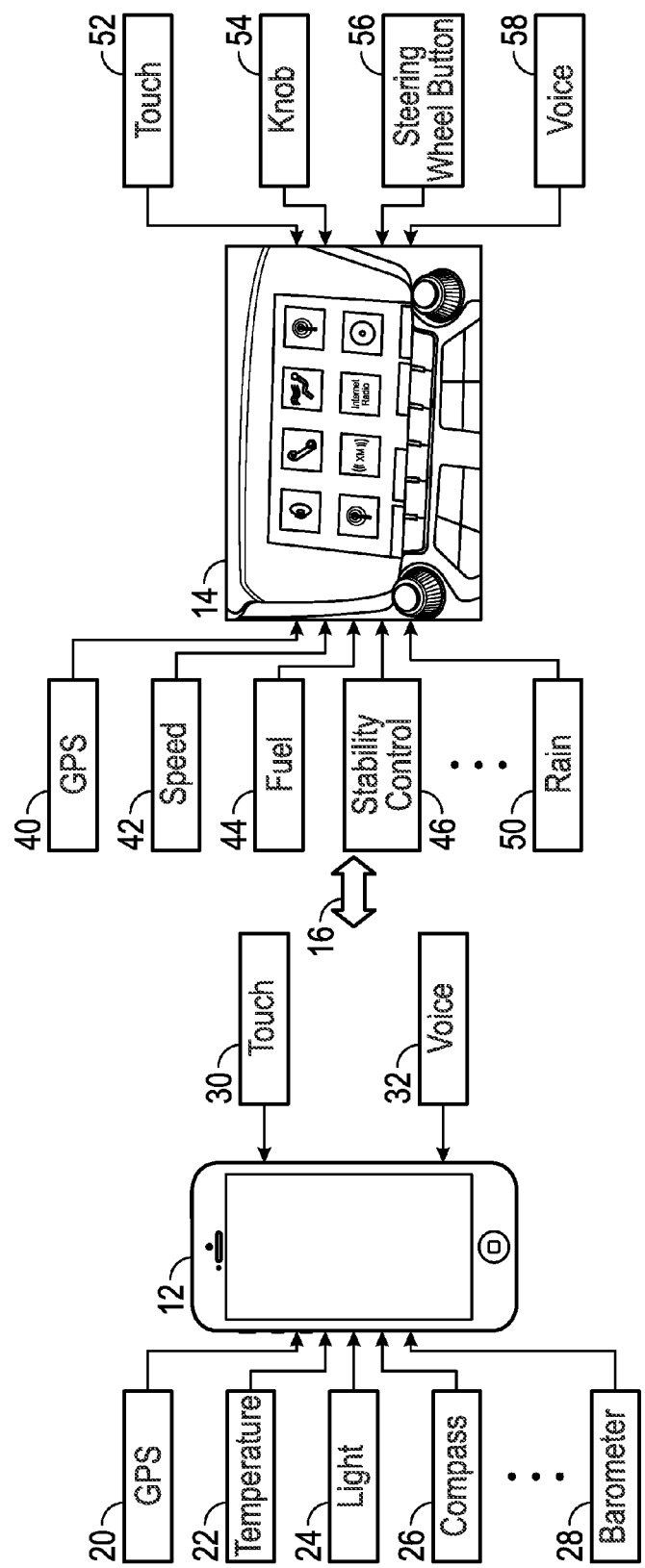
FIG. 1 is a simplified illustration of a vehicle communications module that may be used to facilitate data transfer from an electronic device in a vehicle to a vehicle head unit such that data from the electronic device is used by vehicle applications.

FIG. 1 is an illustration of a communications system 10 that includes a smartphone 12 and a vehicle head unit 14 that are connected via a communications link 16. The vehicle head unit 14 generally represents a vehicular system that may include an infotainment system that is capable of being paired, i.e., in communication with, an electronic device. An example of such a vehicular system is described in U.S. Application Publication No. 2013/0103779 entitled, "Method and Apparatus for Augmenting Smartphone-Centric In-Car Infotainment System Using Vehicle WiFi/DSRC," filed Oct. 21, 2011, assigned to the assignee of the present application and incorporated herein by reference. It is to be understood that the head unit 14 as described herein may include, but is not limited to, a processor and a first display. The processor of the head unit 14 is programmed to include receiving one or more data streams from one or more electronic devices via the communications system 16, transmitting the one or more data streams to one or more displays, and to use data from the external sources such as the smartphone 12 to enhance the performance of existing vehicle systems/applications as well as to contribute to content that is part of the vehicle infotainment system. External information received is selected, synthesized and ranked according to utility function values, where the information with the highest utility function value will preempt information with a lower value.

The smartphone 12 has various sensors that are part of the device. For example, a GPS 20, a temperature sensor 22, a light 24, a compass 26, and a barometer sensor 28 may be part of the smartphone 12. A touch activator 30 and a voice actuator 32 may also be part of the smartphone 12. The head unit 14 may include sensors such as GPS 40, a speed sensor 42, a fuel sensor 44, a stability control sensor 46 and a rain sensor 48. Various actuators may also be part of the head unit 14, such as touch actuation 52, a knob 54, a steering wheel button 56 and voice actuation 58. While both the smartphone 12 and the head unit 14 are initially designed to operate individually, they gradually begin to collaborate using the communications system 16 as is described in detail below. The communications system 16 may use any suitable communication link that is known to those skilled in the art, such as described in U.S. patent application Ser. No. 14/455,683, filed Aug. 8, 2014, entitled, "Method and Apparatus for Supporting Mobile Device Screen Replication in Automotive Environment Using Flexible Network Connectivity," assigned to the assignee of the present application and incorporated herein by reference. Because redundancy in the information gathered by the smartphone 12 and the head unit 14 may occur, for example, GPS information, there is a need to provide an algorithm in the head unit 14 that determines what type of sensor data is available from the smartphone 12, and that also determines what data to use. There may be situations where data is available that the head unit 14 does not want to use for a variety of reasons, e.g., poorer quality data than what is available using vehicle sensors, speed of connection between the smartphone 12 and the vehicle head unit 14, etc.

Figure 2:
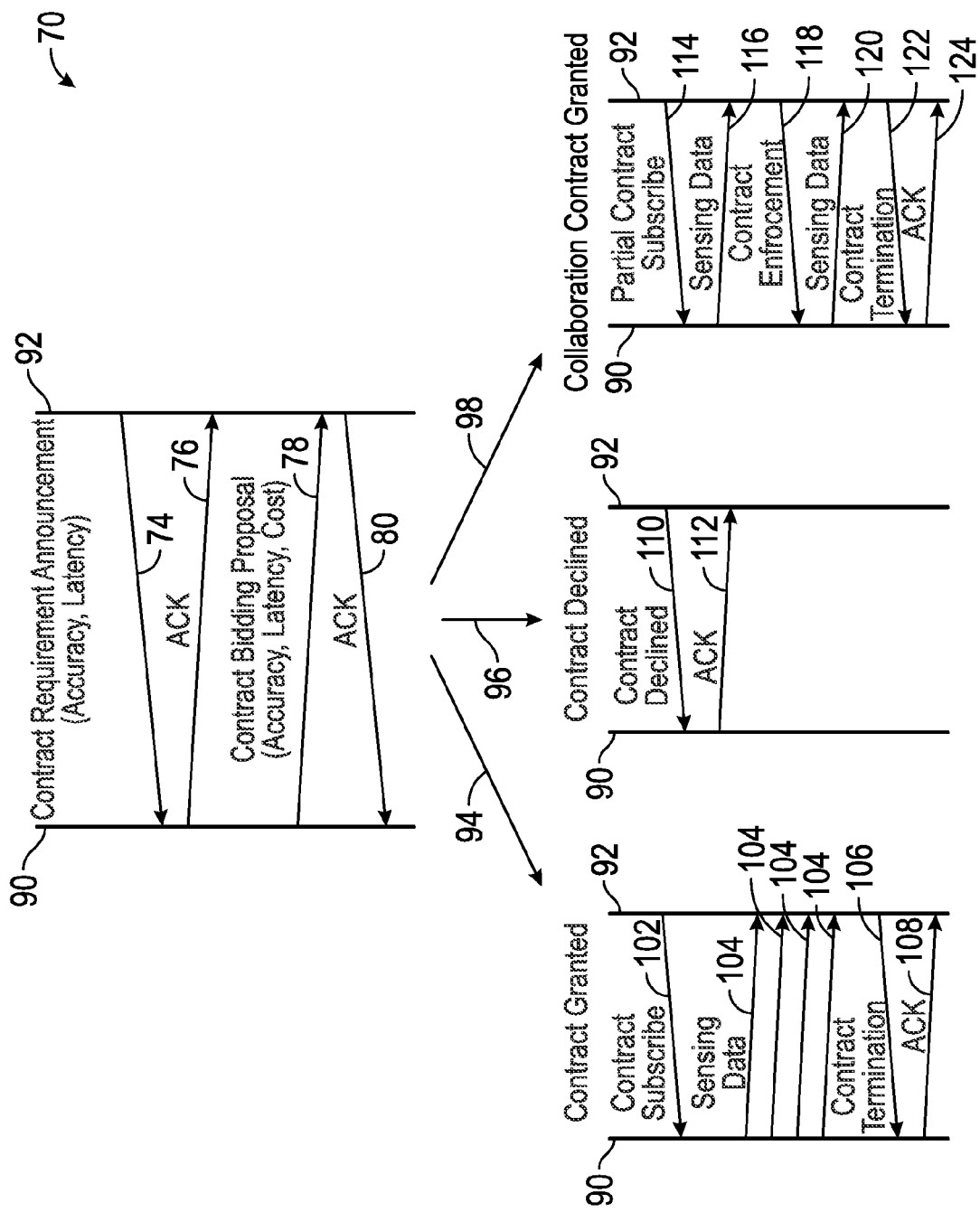
FIG. 2 is an illustration of a vehicle communications architecture that is capable of determining when and how to use data from an electronic device in vehicular applications.

FIG. 2 is an illustration 70 of an exemplary overall architecture that may be used for the system 10 described above. Line 90 represents the smartphone 12 and line 92 represents the head unit 14. An arrow 74 represents a contract requirement announcement from the head unit 92 to the smartphone 90. The contract requirement announcement at the arrow 74 describes the acceptable accuracy and latency of sensor information that the head unit 92 is willing to receive from the smartphone 90. On a line 76, the smartphone 90 acknowledges the content requirement announcement of the line 74. The smartphone 90 sends a contract bidding proposal on a line 78 that includes the accuracy, latency and cost of sensor data that the smartphone 90 has available to the head unit 92. The head unit 92 acknowledges the contract bidding proposal on a line 80.

Once the contract bidding proposal from the smartphone 90 is acknowledged on the line 80, the head unit 92 has three options to choose from: (1) the head unit 92 may grant the contract, as shown on line 94; (2) the head unit 92 may decline the contract, as shown on line 94; and (3) the head unit 92 may grant a collaboration contract, i.e., grant a partial contract, as shown on line 98.

In determining whether or not to grant the contract, the head unit 90 may quantify sensor data from both the vehicle and the smartphone 90 using the following utility function equation:

$$U = \frac{f_{benefit}(\alpha, \tau)}{g_{cost}(C, S, B)} = \frac{w_1\alpha + w_2\tau}{w_3C + w_4S + w_5B} \qquad (1)$$

Where U is the utility function, $f_{benefit}(\alpha,\tau)$ is the benefit of the sensing accuracy ($\alpha$) and sensing latency ($\tau$), $g_{cost}(C,S,B)$ is the cost associated with CPU (C), storage (S), and bandwidth (B). The algorithm of the head unit 92 applies a greedy algorithm to select the sensor with the highest utility value, i.e., $U_A \geq U_B$ or $U_A \leq U_B$.

$$\frac{w_1\alpha + w_2\tau}{w_3C + w_4S + w_5B}$$

is merely exemplary in nature, as there are several ways to define equation (1).

If the head unit 92 decides to grant the contract (as shown on the line 94), the head unit 92 sends a contract subscribe request to the smartphone 90 on a line 102. Thereafter, the smartphone 90 sends the subscribed sensing data on lines 104. The subscribed sensing data may be any data that the smartphone 90 can send to the vehicle head unit 92. For example, elevation sensors in the smartphone 90 may be typically better than those on a vehicle, i.e., the barometer sensor 28 on the smartphone 12 of FIG. 1 may be superior to an equivalent sensor on the vehicle, thus, the vehicle head unit 92 may wish to use barometer sensor data from the smartphone 90. Once the head unit 92 determines that the sensing data on the lines 104 is no longer desired, the head unit 92 sends a contract termination request on a line 106. The smartphone 90 acknowledges that the contract has been terminated on line 108.

If the head unit 92 declines the contract from the smartphone 90 (as shown on the line 96), the head unit 92 sends a contract declined message on a line 110. The smartphone 90 acknowledges the decline on a line 112. If the head unit 92 grants a collaboration contract (as shown on the line 98), a subscription to a part of the contract proposed by the smartphone 90 is sent on a line 114. To decide if a collaboration contract should be granted, the head unit 90 may use a model that is provided by a domain expert, for example, linear weights, to integrate vehicle sensor input and smartphone sensor input to create high-performance sensor data for use in the collaboration contract. For example, barometer from the smartphone 90 could be used with the vehicle's GPS to provide enhanced 3D location information.

To determine the desired place of actuator request that is to be used, i.e., from the smartphone 90 or the vehicle, the head unit 92 may quantify the actuator utility of each using the following equation:

$$U = \frac{f_{benefit}(\beta, \delta, \tau)}{g_{cost}(C, S, B)} = \frac{w_1\beta + w_2\delta + w_3\tau}{w_4C + w_5S + w_6B} \qquad (2)$$

Where U is the utility function of an actuator, $f_{benefit}(\beta,\delta,\tau)$ is the benefit according to application need ($\beta$), user convenience/priority ($\delta$), and execution latency ($\tau$), $g_{cost}(C,S,B)$ is the cost according to required CPU (C), storage (S), and bandwidth (B).

$$\frac{w_1\beta + w_2\delta + w_3\tau}{w_4C + w_5S + w_6B}$$

is merely exemplary in nature, as there are several ways to define equation (2).

The actuator request from the smartphone 90 and the vehicle may be ranked by the vehicle head unit 92 according to their utility function values, or a list of the rankings may be maintained by a static offline preference table. For example, if an actuator request comes from the smartphone 90 and a conflicting actuation request comes from the head unit 92, equation (2) may be used to determine which actuator request to accept and which actuator request to decline.

When using an actuator request from both the smartphone 90 and the vehicle, conflicting sensor data may be received by the vehicle head unit 92. When conflicting data is not received, i.e., when contention does not happen, the actuator (on the vehicle or on the smartphone 90) may directly control/provide the sensing data as needed. When there is contention, the actuator with the highest utility function value will preempt the actuator with a lower utility function value. The actuator with the lower utility function value will be notified of the failure of accessing control of the system. For example, touch screen control in phone projection to the display 30 may be used such that users may control the smartphone 90 by using the touchscreen of the smartphone 90 or by using a screen of the display 30.

The smartphone 90 responds to the grant of a collaboration contract by sending the desired sensing data on a line 116. A contract enforcement signal is sent from the head unit 92 to the smartphone 90 on a line 118 that establishes the contract terms. Next, the smartphone 90 sends sensing data on a line 120. Once the sensing data from the smartphone 90 is no longer desired by the head unit 92, the head unit 92 sends a contract termination signal on a line 122, and thereafter the smartphone 12 acknowledges the termination on a line 124.

Figure 3:
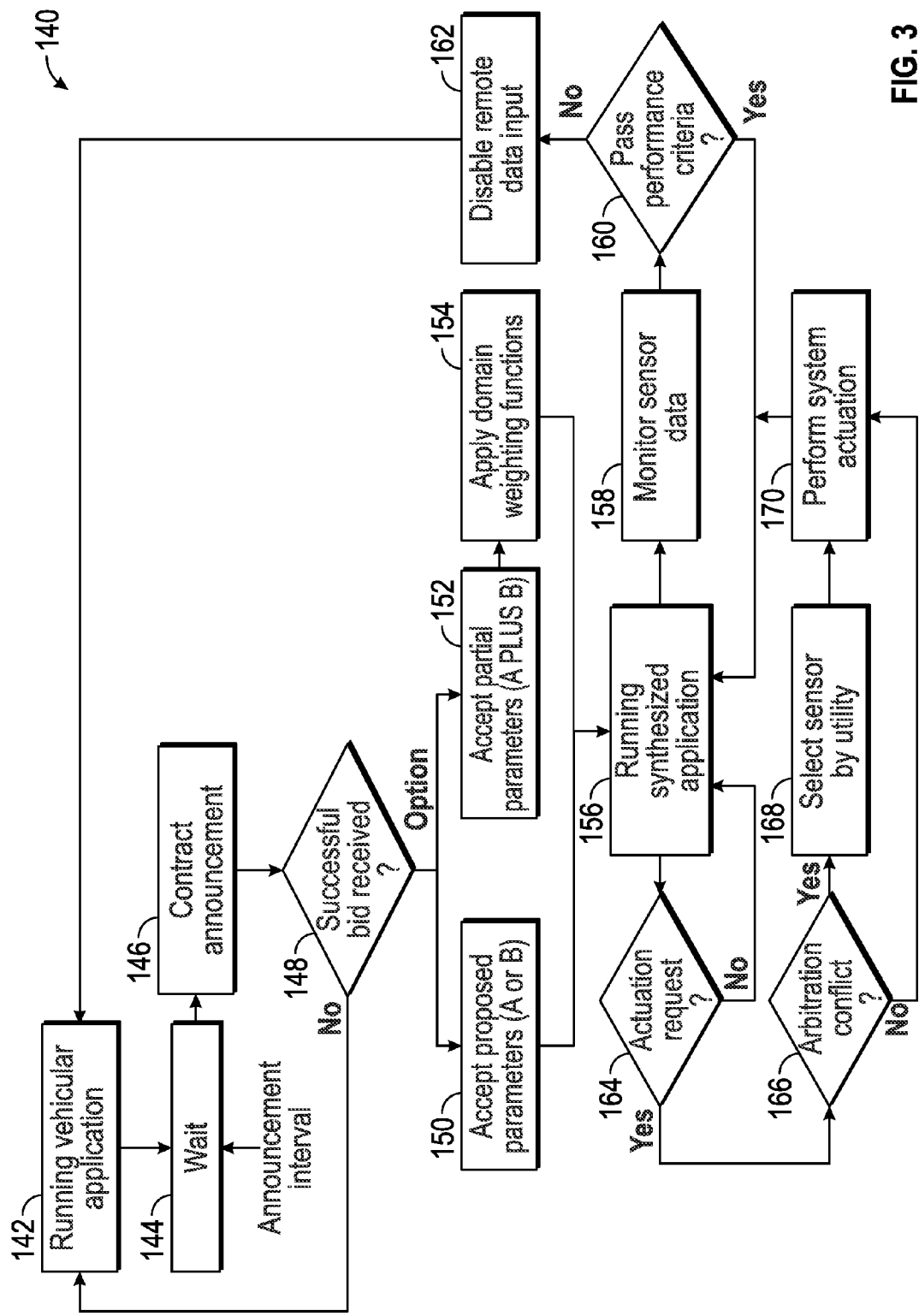
FIG. 3 is a flow diagram of an algorithm of a vehicle head unit that determines whether to use data from an electronic device to enhance vehicle applications that are running on the vehicle.

FIG. 3 is a flow chart diagram 140 of an algorithm for using or declining data from the smartphone 12 to the head unit 14 of FIG. 1 that uses the communications system 16. At box 142 a vehicular application that uses sensor data is determined to be running by the head unit 14. During a wait period at box 144 where the vehicle 10 and the smartphone 12 are waiting for next system-generated events. Next, the head unit 14 announces a contract of the required sensor data to the smartphone 12 at box 146. A determination of whether a successful bid is received from the smartphone 12 is determined at decision diamond 148. If not, the algorithm returns to box 142 to determine if there are vehicular applications running that may benefit from external sensing data.

If a successful bid is received by the head unit 14 at the decision diamond 148, the algorithm may accept the proposed parameters from the smartphone 12 at a box 150 or may accept part of the proposed parameters from the smartphone 12 at a box 152. If a partial contract bid is accepted by the head unit 14, the algorithm applies the domain weighting at box 154 to determine what data to use from the smartphone 12.

The accepted parameters from the box 150 or the partial parameters with the applied domain weighting functions at the box 154 are used in a running/synthesized vehicle application at box 156. Sensor data is monitored at box 158, and the algorithm determines if the monitored sensor data passes performance criteria at a decision diamond 160. If not, the data being monitored is disabled at a box 162.

If the data being monitored passes the performance criteria at the decision diamond 160, the data continues to be used in the running/synthesized application at the box 156. If an actuation request is received from the smartphone 12 or the vehicle head unit 14 at a decision diamond 164, the algorithm determines if there is an arbitration conflict at decision diamond 166. If there is not an actuation request at the decision diamond 164, the algorithm returns to the box 156 and the data continues to be used in the running/synthesized application.

If there is not an arbitration conflict at the decision diamond 166, the requested system actuation is performed at box 170 and the data continues to be used in the running/synthesized application at the box 156. For example, a touch screen on the smartphone 12 or the head unit 14. If there is an arbitration conflict at the decision diamond 166, the sensor that has the highest utility function will be selected at box 168 and the remaining sensor(s) will not be selected. Once the sensor with the highest utility function is selected at the box 168, the requested system actuation is performed at the box 170 and the data continues to be used in the running/synthesized application at the box 156. For example, using the vehicle GPS 40 (for longitude and latitude) and the barometer sensor 28 of the smartphone 12 (for elevation) to get a 3D position.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for using data that is external to a vehicle in vehicular application, said method comprising:
   determining data that is external to the vehicle is available for use;
   comparing the external data to data that is available on a vehicle system;
   determining whether the external data has a higher utility function compared to data that is available on the vehicle system, where the utility function is computed based on an accuracy, a latency and a cost of the data; and
   using the external data to enhance a vehicular application if the external data has a higher utility function than the data that is available on the vehicle system.

2. The method according to claim 1 wherein the external data is sensor data that is capable of being communicated from an electronic device to the vehicle.

3. The method according to claim 1 further comprising providing a communications link that allows the external data to be communicated to the vehicle.

4. The method according to claim 1 wherein determining the external data is available includes sending a contract requirement announcement from the vehicle, where electronic devices in communication with the vehicle are to respond by providing a contract bid proposal that includes the accuracy, the latency and the cost of the external data available on the electronic device.

5. The method according to claim 1 wherein using the external data includes accepting the external data that is proposed in whole or in part.

6. The method according to claim 5 wherein using the external data that is proposed in part includes using a model to integrate the external data and the vehicle data to create high-performance data for use in a vehicular application.

7. The method according to claim 1 further comprising determining whether to accept an external actuation request or a vehicle actuation request when conflicting actuation requests are received by determining the utility value of each of the actuation requests and using the actuation request with the highest utility value.

8. A vehicle system for using data that is external to a vehicle in vehicular applications, said system comprising:
a communications link that is able to send and receive external data from at least one electronic device that is not part of the vehicle;
a vehicle head unit that includes an infotainment system; and
a controller, said controller programmed to compare the external data that is from the at least one electronic device to data available from a vehicle system or sensor, and to determine whether the external data has a higher utility function compared to data that is available from the vehicle system, where the utility function is computed based on an accuracy, a latency and a cost of the data, said controller further programmed to use the external data to enhance a vehicular application if the external data has a higher utility function.

9. The system according to claim 8 wherein the electronic device is a handheld device, computer, tablet or a combination thereof.

10. The system according to claim 8 wherein the controller is further programmed to determine the details of the external data that is available by sending a contract requirement announcement from the vehicle, where the at least one electronic device responds by providing a contract bid proposal that includes the accuracy, the latency and the cost of the external data.

11. The system according to claim 8 wherein the controller is capable of accepting the external data that is proposed in whole or in part.

12. The system according to claim 11 wherein using the external data that is proposed in part includes using a model to integrate the external data and vehicle data to create high-performance data for use in a vehicular application.

13. The system according to claim 12 wherein the model includes a domain expert that is capable of ranking all of the data according to a utility function that is a cost/benefit analysis.

14. The system according to claim 8 wherein the controller is further programmed to determine whether to accept an actuation request or a vehicle actuation request when conflicting actuation requests are received by determining the utility value of each of the actuation requests and using the actuation request with the highest utility value.

15. A system platform that is capable of using data from devices external to the system platform on the system platform to enhance platform applications, said system platform comprising:
a communications link that is able to send and receive external data and an actuation request from at least one electronic device that is not part of the system platform; and
a system platform controller, said controller programmed to compare external data that is from the at least one electronic device to data that is available on the system platform, and to determine whether the external data has a higher utility function compared to data that is available on the system platform, said controller further programmed to use the external data to enhance system platform applications if the external data has a higher utility function by accepting the external data in whole or in part, said controller further programmed to determine whether to accept an external actuation request or a system platform actuation request when conflicting actuation requests are received by determining the utility value of each of the actuation requests and using the actuation request with the highest utility value.

16. The system platform according to claim 15 wherein the controller is further programmed to determine whether external data is available by sending a contract requirement announcement from the system platform to the at least one external electronic device, where the at least one external electronic device responds by providing a contract bid proposal that includes accuracy, latency and cost of the external data.

17. The system platform according to claim 16 wherein the contract bid proposal from the at least one external electronic device is used to compare the accuracy, latency and cost of the external data compared to data on the system platform, wherein the controller is further programmed to accept the bid proposal, decline the bid proposal, or accept the bid proposal in part based on the comparison.

18. The system platform according to claim 15 wherein using the external data that is proposed in part includes using a model to integrate external data and vehicle data to create a high-performance data for use in a vehicular application.

19. The system platform according to claim 18 wherein the controller may stop receiving the external data by cancelling the contract for receiving said external data.

20. The system platform according to claim 18 wherein the model includes a domain expert that is capable of ranking all of the data available according to utility function of the data.

* * * * *